United States Patent
Guan et al.

(10) Patent No.: US 9,425,928 B2
(45) Date of Patent: Aug. 23, 2016

(54) DATA TRANSMISSION METHOD AND DEVICE

(71) Applicant: ZTE CORPORATION, Shenzhen, Guangdong Province (CN)

(72) Inventors: Yanfeng Guan, Shenzhen (CN); Xianming Chen, Shenzhen (CN); Wei Luo, Shenzhen (CN); Yifei Yuan, Shenzhen (CN); Zhisong Zuo, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 66 days.

(21) Appl. No.: 14/408,278

(22) PCT Filed: Jun. 19, 2013

(86) PCT No.: PCT/CN2013/077476
§ 371 (c)(1),
(2) Date: Dec. 15, 2014

(87) PCT Pub. No.: WO2013/189288
PCT Pub. Date: Dec. 27, 2013

(65) Prior Publication Data
US 2015/0180621 A1    Jun. 25, 2015

(30) Foreign Application Priority Data
Jun. 19, 2012  (CN) .......................... 2012 1 0203377

(51) Int. Cl.
*H04W 4/00* (2009.01)
*H04L 5/00* (2006.01)
(Continued)

(52) U.S. Cl.
CPC .............. *H04L 5/0007* (2013.01); *H04B 1/713* (2013.01); *H04B 1/7136* (2013.01); *H04L 5/0012* (2013.01); *H04L 5/0055* (2013.01); *H04W 72/0446* (2013.01)

(58) Field of Classification Search
USPC .......... 370/229, 230, 252, 328, 329, 330, 343
See application file for complete search history.

(56) References Cited

U.S. PATENT DOCUMENTS 8,687,657 B2    4/2014  Ishii
8,774,160 B2    7/2014  Zhang et al.
(Continued)

FOREIGN PATENT DOCUMENTS

CN    101841918 A    9/2010
CN    102045789 A    5/2011
(Continued)

OTHER PUBLICATIONS

International Search Report (Form PCT/ISA/210) for PCT/CN2013/077476, mailed Sep. 26, 2013.

*Primary Examiner* — Kwang B Yao
*Assistant Examiner* — Nguyen Ngo
(74) *Attorney, Agent, or Firm* — Kappel, Patrick, Hebyl & Philpott

(57) ABSTRACT

Provided are a data transmission method and device. The method includes: determining, by means of a frequency hopping manner according to a TTI Bundling parameter, a frequency domain position of a physical resource block in a slot for sending a TTI Bundling, wherein a frequency hopping variable i of the frequency hopping manner is determined according to the TTI Bundling parameter by means of one of or a combination of predetermined approaches, where mod is a modulus operation, floor is rounded down operation, $n_s$ is a sequence number of the time slot; transmitting data on a time frequency resource corresponding to the frequency domain position of the physical resource block in the slot of the TTI bundling. According to the solution, the coverage area of the TTI bundling data transmission is improved.

20 Claims, 4 Drawing Sheets

(51) Int. Cl.
*H04B 1/713* (2011.01)
*H04B 1/7136* (2011.01)
*H04W 72/04* (2009.01)

(56) References Cited

U.S. PATENT DOCUMENTS

| | | | | |
|---|---|---|---|---|
| 2009/0257408 A1* | 10/2009 | Zhang | H04L 1/1621 | 370/336 |
| 2009/0290559 A1* | 11/2009 | Pelletier | H04L 1/189 | 370/336 |
| 2013/0250869 A1* | 9/2013 | Eriksson | H04W 72/1231 | 370/329 |
| 2013/0250924 A1* | 9/2013 | Chen | H04L 1/1819 | 370/336 |
| 2014/0362832 A1* | 12/2014 | Rudolf | H04L 1/1822 | 370/336 |
| 2015/0117287 A1* | 4/2015 | Kim | H04W 52/0216 | 370/311 |

FOREIGN PATENT DOCUMENTS

| | | |
|---|---|---|
| CN | 102365827 A | 2/2012 |
| EP | 1848115 A2 | 10/2007 |
| TW | 201004209 A1 | 1/2010 |

* cited by examiner

DATA TRANSMISSION METHOD AND DEVICE

TECHNICAL FIELD

The disclosure relates to the field of communications, and in particular to a data transmission method and device.

BACKGROUND

In a wireless communication system, the capacity and coverage are two important performance indicators. In order to increase the capacity, the common frequency mode is generally used for networking. However, networking by the common frequency mode increases inter-cell interference, thus resulting in the degrading in the coverage performance.

For example, in a Long Term Evolution (LTE) system, the Orthogonal Frequency Division Multiple Access (OFDMA) technique is used in downlink, and the Single Carrier-Frequency Division Multiple Access (SC-FDMA) technique is used in uplink. However, since the common frequency mode is generally used in networking, the Inter-Cell Interference (ICI) increases apparently. In order to reduce the ICI, the LTE adopts some anti-interference techniques, e.g., the downlink Inter-Cell Interference Cancellation (ICIC). The downlink ICIC technique realizes the function of downlink interference advance warning on the basis of a method for Relative Narrowband TX Power (RNTP) limiting of an evolved Node B (eNodeB), and enhances the coverage performance of the Physical Downlink Shared Channel (PDSCH). The uplink adopts an ICIC technique based on the High Interference Indication/Overload Indication (HII/OI) and enhances the coverage performance of the Physical Uplink Shared Channel (PUSCH).

In addition, the Channel Coding technique and the Multiple Input Multiple Output (MIMO) technique have made important contributions to the improvement of the link transmission performance, so that the data can resist various types of fading in the channel. The MIMO technique, especially the Coordinated Multiple Point (CoMP) technique which is developed on the basis of the MIMO technique, can also improve the coverage performance and capacity performance of the LTE system by means of the Spatial Diversity, Spatial Multiplex and beam-forming techniques. However, the MIMO technique and CoMP technique rely heavily on the measurement and feedback of the channel state information. The User Equipment (UE) having a very low signal-to-noise ratio is still a bottleneck for the measurement and feedback of the wireless channel in the wireless system during a period of time at present and in the future: on the one hand, the more complete and accurate the feedback is, the larger the feedback amount is, which is a challenge to the capacity and coverage distance; on the other hand, it is very difficult to guarantee the feedback delay and the accuracy for a fast fading channel. Therefore, for a UE of which the coverage is limited, it is very difficult for the closed-loop MIMO technique and CoMP technique to acquire the required gain, instead, the simple and practical open-loop MIMO technique is often adopted. The open-loop MIMO technique is generally combined with resource frequency hopping, because the resource frequency hopping is a quasi-open-loop resource allocation technique, the subsequent resource allocation is determined by means of a frequency hopping manner and initial resource allocation, thereby saving resource allocation cost and feedback cost.

There are multiple techniques which can improve the transmission performance of the system in the LTE system, especially the coverage performance. However, it is found from experimental network tests and simulations that the PUSCH with a medium data rate, the PDSCH with a high data rate and Voice over IP (VoIP) services are still channels of which the coverage performance is limited in the channels in the LTE system. The main reason lies in that the limited UE transmission power results in the PUSCH with the medium data rate and the VoIP being limited, and the ICI between base stations results in the PDSCH with the high data rate being limited. This proposes the requirement for the improvement of the LTE system coverage performance, and for this purpose, the Transmission Time Interval (TTI) Bundling technique is introduced to the LTE system. The TTI Bundling technique forms various redundancy versions for the entire data packet by means of Channel Coding, wherein various redundancy versions are respectively transmitted in multiple successive TTIs, and the transmission in multiple non-successive TTIs is also under evaluation. The TTI Bundling technique acquires the coding gain and the diversity gain by occupying more transmission resources so as to acquire higher receiving power and link signal-to-noise ratio, thereby improving the coverage capability of the LTE system. In exchange for the coverage performance, the TTI Bundling technique reduces the spectrum efficiency, and is mainly used in a UE having a very low signal-to-noise ratio. Generally, for the UE having a very low signal-to-noise ratio, the coverage performance thereof may also be improved by means of the diversity technique, for example, the frequency diversity technique. In the existing LTE standard technologies, the TTI Bundling and the frequency diversity may be used at the same time. However, when the existing TTI Bundling technique and the existing frequency diversity technique are combined, the acquisition of the frequency diversity gain and the increase of the control cost are limited to some extent, this is because the existing frequency diversity technique is not designed specially for the TTI Bundling technique.

For example, as shown in FIG. 1, the first transmission of the first VoIP packet from the UE is performed at the Transmission Time Intervals 4 to 7 of the Physical Uplink Shared Channel (PUSCH), with the four successive TTIs from 4 to 7 being referred to as a TTI Bundling of which the TTI Bundling Size is 4. The control information (e.g., the resource position etc.) of the TTI Bundling is indicated by the Physical Downlink Control Channel (PDCCH) in the TTI 0 corresponding to the first TTI (TTI 4) in the TTI Bundling. After receiving the TTI Bundling, a receiving end (e.g., an eNodeB) indicates the Acknowledge/Non-Acknowledge (ACK/NACK) response information of the Hybrid Automatic Repeat Request (HARQ) entity on a downlink Physical HARQ Indication Channel (PHICH) at the Transmission Time Interval 12. If the corresponding response is a negative response NACK, the second transmission of the first VoIP packet (i.e. the first retransmission of the TTI Bundling) will be performed on the Physical Uplink Shared Channel (PUSCH) at the Transmission Time Intervals 21 to 24, and the corresponding Acknowledge/Non-Acknowledge (ACK/NACK) response of the Hybrid Automatic Repeat Request (HARQ) entity is transmitted on the downlink PHICH at the Transmission Time Interval 28; and so on, until the corresponding response is an Acknowledge (ACK) response, or the maximum number of times of transmission attempt (e.g., 4 times) is reached, the transmission of the first VoIP packet ends. Similarly, the manner of the transmission of the nth VoIP packet is the same as that of the transmission of the first VoIP packet. It can be seen from the transmission as shown in FIG. 1 that when the resource blocks allocated to the TTI Bundling are centralized resource blocks, that is, the physical positions of the resource blocks in two Slots within one TTI are the same, the physical positions of the resource blocks of multiple TTIs in one TTI Bundling are exactly the same, and in order to save control cost under the Semi-Persistent Scheduling (SPS), the physical positions of the resource blocks in successive TTI Bundlings are exactly the same, which will seriously limit the acquisition of the frequency diversity gain.

The physical positions of the resource blocks in the TTI Bundling may be changed by adding the transmission of the PDCCH, but the control cost will be apparently increased, and the physical positions of the resource blocks of multiple TTIs in one TTI Bundling are exactly the same. When the resource blocks assigned to the TTI Bundling are centralized resource blocks, that is, the physical positions of the resource blocks in two Slots within one TTI are different, two Slots within one TTI cannot adopt joint channel estimation, the accuracy of the channel estimation will be degraded and the system performance will also be degraded.

An enhanced TTI Bundling technique is proposed on the basis of the TTI Bundling technique of the LTE R8, for example, as shown in FIG. 2. The interval between two TTI Bundlings is 4 TTIs, the first transmission and retransmission may use one HARQ process or multiple (e.g., two) HARQ processes; similarly, the interval between two TTI Bundlings is 8 TTIs, the first transmission and retransmission may use one HARQ process or multiple (e.g., two) HARQ processes. However, the enhancing theories thereof are to increase the maximum number of TTIs occupied by the first transmission and retransmission of a VoIP packet altogether from 12 or 16 to 20, thereby improving the accumulated transmission power or adding the redundancy versions of the HARQ, but is still the same as the mechanism of the LTE R8 in the aspect of the resource allocation of the TTI Bundling and seriously limit the acquisition of the frequency diversity gain.

In summary, as regards the Transmission Time Interval Bundling technique in related technologies, the lower frequency diversity gain results in the problem of the smaller data transmission coverage area, and no effective solution has been proposed at present.

SUMMARY

With respect to the Transmission Time Interval Bundling technique in related technologies, the lower frequency diversity gain results in the problem of the smaller data transmission coverage area, and the embodiments of the disclosure provide a data transmission method and device so as to at least solve the problem.

According to one embodiment of the disclosure, a data transmission method is provided, including: determining, by means of a frequency hopping manner according to a Transmission Time Interval Bundling (TTI Bundling) parameter, a frequency domain position of a physical resource block in a slot for sending a TTI Bundling, wherein a frequency hopping variable i of the frequency hopping manner is determined according to the TTI Bundling parameter by means of one of or a combination of the following approaches, where mod is a modulus operation, floor is a rounded down operation, and $n_s$ is a slot sequence number:

$i=\text{floor}(n_s/(2*\text{TTI Bundling parameter}))+\text{mod}(\text{floor}(n_s/2),2),$ $i=\text{floor}(n_s/(\text{TTI Bundling parameter}))+\text{mod}(\text{floor}(n_s/2),2);$ and transmitting data on a time frequency resource corresponding to the determined frequency domain position of the physical resource block in the slot of the TTI bundling.

In the described embodiment, the TTI Bundling parameter is a positive integer and is determined according to the number of bundling Transmission Time Intervals (TTI), TTI_BUNDLING_SIZE, in the TTI Bundling.

In the described embodiment, determining, by means of the frequency hopping manner according to the TTI Bundling parameter, the frequency domain position of the physical resource block in the slot for sending the TTI Bundling includes:

determining the frequency domain position $n_{PRB}$ according to the TTI Bundling frequency hopping variable i by means of the following formula:

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases},$$

wherein $\tilde{n}_{PRB}(n_s)=(\tilde{n}_{VRB}+f_{hop}(i) \cdot N_{RB}^{sb}+((N_{RB}^{sb}-1)-2(\tilde{n}_{VRB} \bmod N_{RB}^{sb})) \cdot f_m(i)) \bmod (N_{RB}^{sb} \cdot N_{sb})$ $\tilde{n}_{PRB}(n_s)$ is an offset index of the physical resource block, $\tilde{n}_{VRB}$ is an offset index of a virtual resource block, $N_{RB}^{HO}$ is a frequency hopping offset, $\lceil x \rceil$ is a rounded up operation on x, $f_{hop}(i)$ is a sub-band frequency hopping function, $N_{RB}^{sb}$ is the number of resource blocks within a sub-band, $f_m(i)$ is a mirroring frequency hopping function, mod is the modulus operation, $N_{sb}$ is the number of sub-bands, and $n_s$ is the slot sequence number.

In the described embodiment, $f_{hop}(i)$ is determined according to the following formula:

$$f_{hop}(i) = \begin{cases} 0 & N_{sb} = 1 \\ \left( \sum_{k=i \cdot 10+1}^{i \cdot 10+9} c(k) \times 2^{k-(i \cdot 10+1)} \right) \bmod N_{sb} & N_{sb} = 2 \\ \left( \left( \left( \sum_{k=i \cdot 10+1}^{i \cdot 10+9} c(k) \times 2^{k-(i \cdot 10+1)} \right) \bmod (N_{sb}-1) \right) + 1 \right) & N_{sb} > 2 \end{cases}$$

wherein mod is the modulus function, $N_{sb}$ is the number of sub-bands, c is a random sequence, and k is a serial number of the random sequence, with k being a non-negative integer.

In the described embodiment, $f_m(i)$ is determined according to the following formula:

$f_m(i)=i \bmod 2$; or, $f_m(i)=c[((i \bmod 2)+\text{CURRENT\_TX\_NB}) \cdot q]$ wherein mod is the modulus function, CURRENT_TX_NB is the current number of times of transmission, and q is a positive integer.

In the described embodiment, the formula corresponding to $f_m(i)$ is determined by means of one of the following approaches: a radio resource control (RRC) layer message instruction; a resource granting message instruction; and a predefinition.

In the described embodiment, $N_{RB}^{sb}$ is determined according to the following formula:

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases},$$

wherein $N_{RB}^{UL}$ is the total number of resource blocks in one slot corresponding to an uplink bandwidth, $N_{RB}^{HO}$ is a frequency hopping offset, and $\lfloor y \rfloor$ a rounded down operation on y.

In the described embodiment, the formula corresponding to the TTI Bundling frequency hopping variable i is determined by means of one of the following approaches: an RRC layer message instruction; a resource granting message instruction; and a predefinition.

According to another embodiment of the disclosure, a data transmission device is provided, including: a determination component which is configured to determine, by means of a frequency hopping manner according to the Transmission Time Interval Bundling (TTI Bundling) parameter, a frequency domain position of a physical resource block in a slot for sending a TTI Bundling, wherein a frequency hopping variable i of the frequency hopping manner is determined according to the TTI Bundling parameter by means of one of or a combination of the following approaches, where mod is a modulus operation, floor is a rounded down operation, and $n_s$ is a slot sequence number:

$i=\text{floor}(n_s/(2*\text{TTI Bundling parameter}))+\text{mod}(\text{floor}(n_s/2),2),$ $i=\text{floor}(n_s/(\text{TTI Bundling parameter}))+\text{mod}(\text{floor}(n_s/2),2);$ and a transmission component which is configured to transmit data on a time frequency resource corresponding to the determined frequency domain position of the physical resource block in the slot.

In the described embodiment, the TTI Bundling parameter is a positive integer and is determined according to the number of bundling Transmission Time Intervals (TTI), TTI_BUNDLING_SIZE, in the TTI Bundling.

In the described embodiment, the determination component is configured to determine the frequency domain position $n_{PRB}$ according to the TTI Bundling frequency hopping variable i by means of the following formula:

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases},$$

wherein $\tilde{n}_{PRB}(n_s)=(\tilde{n}_{VRB}+f_{hop}(i)\cdot N_{RB}^{sb}+((N_{RB}^{sb}-1)-2(\tilde{n}_{VRB} \bmod N_{RB}^{sb}))\cdot f_m(i)) \bmod (N_{RB}^{sb}\cdot N_{sb})$, $\tilde{n}_{PRB}(n_s)$ is an offset index of the physical resource block, $\tilde{n}_{VRB}$ is an offset index of a virtual resource block, $N_{RB}^{HO}$ is a frequency hopping offset, $\lceil x \rceil$ is a rounded up operation on x, $f_{hop}(i)$ is a sub-band frequency hopping function, $N_{RB}^{sb}$ is the number of resource blocks within a sub-band, $f_m(i)$ is a mirroring frequency hopping function, mod is the modulus operation, $N_{sb}$ is the number of sub-bands, and $n_s$ is the slot sequence number.

According to the embodiments of the disclosure, the frequency domain position of the physical resource block in the slot for sending the TTI Bundling is determined by means of a frequency hopping manner according to the TTI Bundling parameter, wherein i is determined by means of predetermined approaches or the combinations thereof, then data transmission is performed on the time frequency resource corresponding to the frequency domain position. By virtue of the above solution, data transmission can be performed on the physical resource determined by means of a frequency hopping manner when using TTI Bundling, and the problem of the smaller data transmission coverage area caused by the lower frequency diversity gain in the Transmission Time Interval Bundling technique in related technologies is solved, thereby achieving the effect of improving the data frequency diversity gain in the TTI Bundling transmission mode and improving the coverage area of data transmission.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
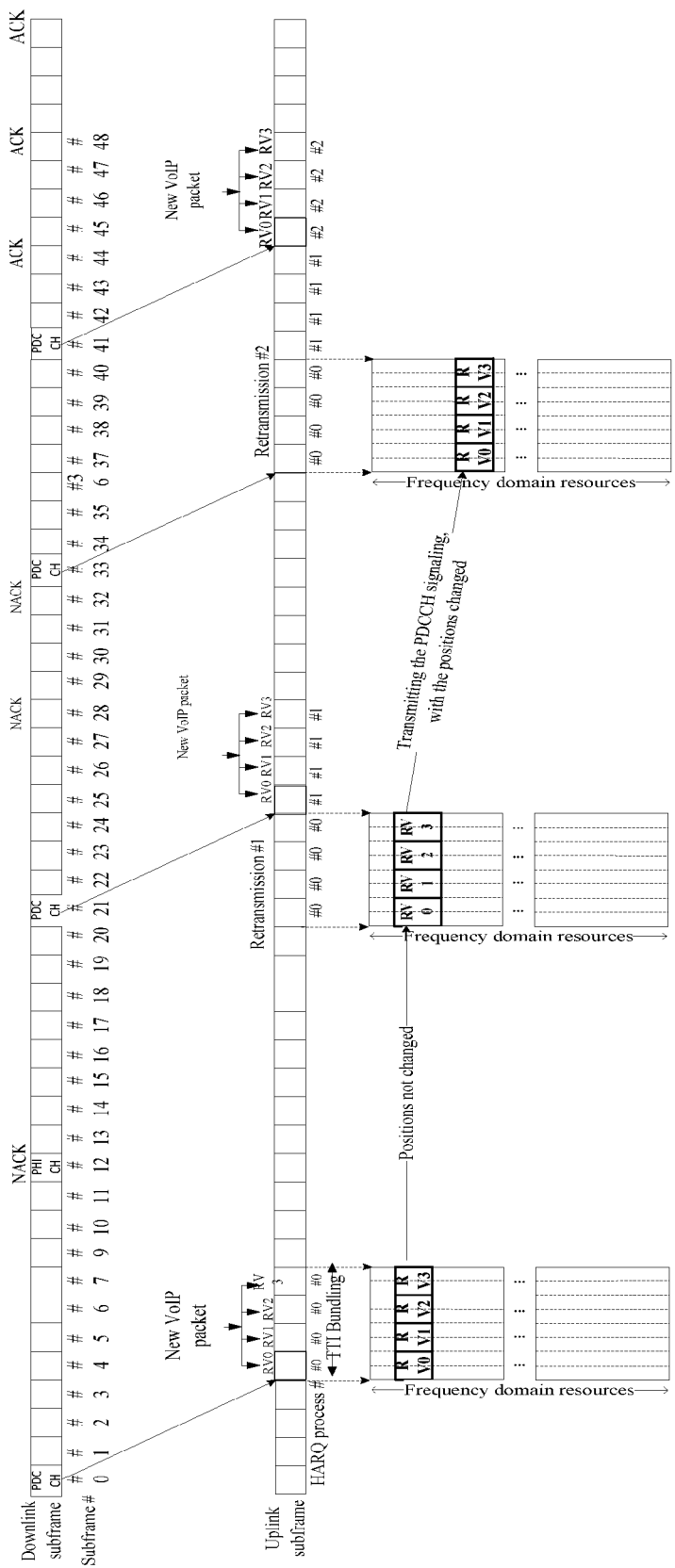
FIG. 1 is a schematic diagram showing the implementation of VoIP transmission on the basis of the Transmission Time Interval Bundling technique in an LTE R8 according to a related technology.
Figure 2:
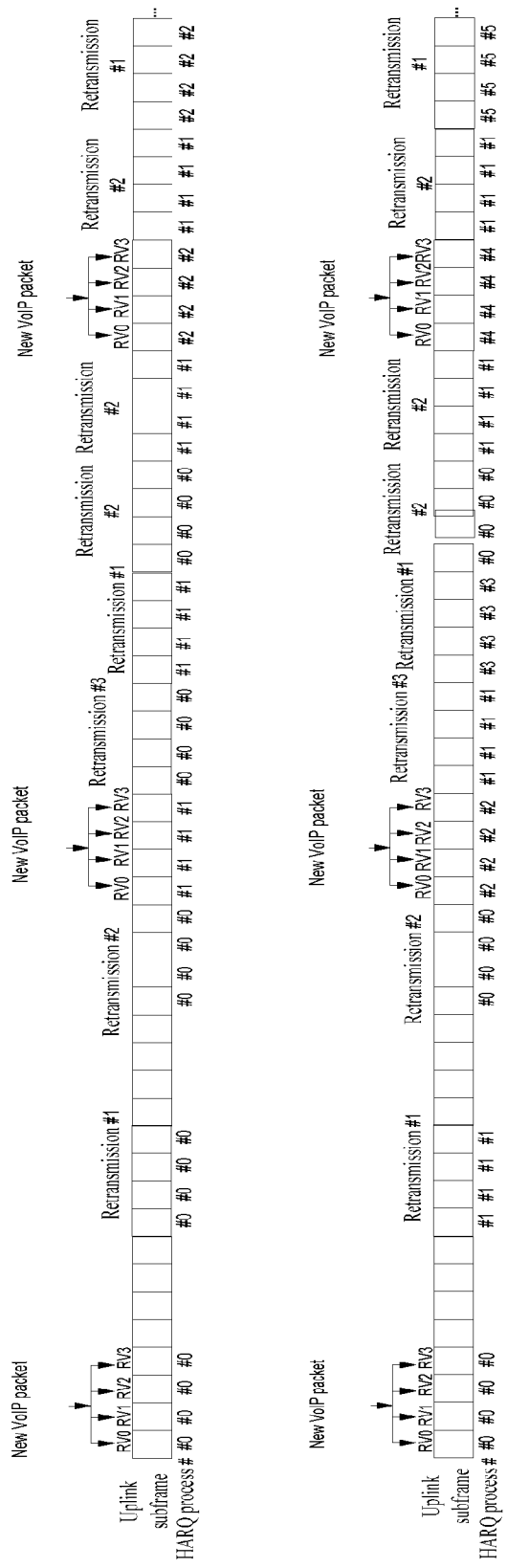
FIG. 2 is a schematic diagram showing the implementation of VoIP transmission based on the enhanced Transmission Time Interval Bundling technique according to the related technology.
Figure 3:
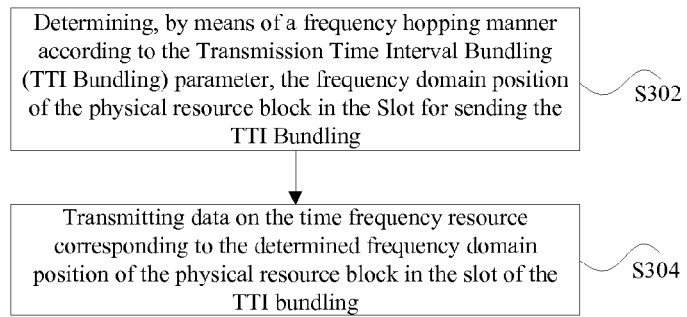
FIG. 3 is a flowchart illustrating a data transmission method according to an embodiment of the disclosure.

The present embodiment provides a data transmission method. FIG. 3 is a flowchart illustrating a data transmission method according to an embodiment of the disclosure, as shown in FIG. 3, the method includes the following steps S302 and S304.

Step S302: a frequency domain position of a physical resource block in a slot for sending the TTI Bundling is determined by means of a frequency hopping manner according to the Transmission Time Interval Bundling (TTI Bundling) parameter, wherein a frequency hopping variable i of the frequency hopping manner is determined according to the TTI Bundling parameter by means of one of or a combination of the following approaches, where mod is a modulus operation, floor is a rounded down operation, and $n_s$ is a slot sequence number:

$i=\text{floor}(n_s/(2*\text{TTI Bundling parameter}))+\text{mod}(\text{floor}(n_s/2),2),$ $i=\text{floor}(n_s/(\text{TTI Bundling parameter}))+\text{mod}(\text{floor}(n_s/2),2);$ Step S304: data is transmitted on a time frequency resource corresponding to the determined frequency domain position of the physical resource block in the slot of the TTI bundling.

According to the above-mentioned steps, the frequency domain position of the physical resource block in the slot for sending the TTI Bundling is determined by means of a frequency hopping manner according to the TTI Bundling parameter, then data is transmitted on the time frequency resource corresponding to the determined frequency domain position. By virtue of the solution, data transmission can be performed on the physical resource determined by means of a frequency hopping manner when using TTI Bundling, and the problem of the smaller data transmission coverage area caused by the lower frequency diversity gain in the Transmission Time Interval Bundling technique in related technologies is solved, thereby improving the data frequency diversity gain in the TTI Bundling transmission mode and improving the coverage area of data transmission.

During implementation, the TTI Bundling parameter is a positive integer and may be a parameter relevant to the TTI Bundling or determined according to the relevant parameter. In an example embodiment, the TTI Bundling parameter may be a value determined according to the number of bundling Transmission Time Intervals, TTI_BUNDLING_SIZE, in the TTI Bundling, for example, the TTI Bundling parameter may be the TTI_BUNDLING_SIZE or a value calculated from the TTI_BUNDLING_SIZE. The approach achieves the flexible determination of the TTI Bundling parameter.

In an example embodiment, the frequency domain position $n_{PRB}$ may be determined according to the frequency hopping variable i by means of the following formula in the above-mentioned steps:

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases},$$

wherein $\tilde{n}_{PRB}(n_s) = (\tilde{n}_{VRB} + f_{hop}(i) \cdot N_{RB}^{sb} + ((N_{RB}^{sb}-1) - 2(\tilde{n}_{VRB} \bmod N_{RB}^{sb})) \cdot f_m(i)) \bmod (N_{RB}^{sb} \cdot N_{sb})$, $\tilde{n}_{PRB}(n_s)$ is an offset index of the physical resource block, $\tilde{n}_{VRB}$ is an offset index of the virtual resource block, $N_{RB}^{HO}$ is a frequency hopping offset, $\lceil x \rceil$ is the rounded up operation on x, $f_{hop}(i)$ is a sub-band frequency hopping function, $N_{RB}^{sb}$ is the number of resource blocks within the sub-band, $f_m(i)$ is a mirroring frequency hopping function, mod is the modulus operation, $N_{sb}$ is the number of sub-bands, and $n_s$ is the slot sequence number. The example embodiment determines the frequency domain position according to the value of i, and improves the frequency diversity gain of TTI Bundling data transmission.

It should be noted that the frequency domain position $n_{PRB}$ is an index of the physical resource block, and identifies the frequency domain position, thus the frequency domain position and $n_{PRB}$ are equivalent concepts in the case with no confusion, which will not be repeated again.

In an example embodiment, $f_{hop}(i)$ may be determined by means of the following formula:

$$f_{hop}(i) = \begin{cases} 0 & N_{sb} = 1 \\ \left(\sum_{k=i\cdot 10+1}^{i\cdot 10+9} c(k) \times 2^{k-(i\cdot 10+1)}\right) \bmod N_{sb} & N_{sb} = 2 \\ \left(\left(\sum_{k=i\cdot 10+1}^{i\cdot 10+9} c(k) \times 2^{k-(i\cdot 10+1)}\right) \bmod (N_{sb}-1)\right) + 1 & N_{sb} > 2 \end{cases}$$

wherein c is a random sequence, $N_{sb}$ is the number of sub-bands, k is the serial number of the random sequence, with k being a non-negative integer, and mod is the modulus function.

In an example embodiment, $f_m(i) = i \bmod 2$; or $f_m(i) = c[((i \bmod 2) + \text{CURRENT\_TX\_NB}) \cdot q]$ wherein mod is the modulus function, CURRENT_TX_NB is the current number of times of transmission, and q is a positive integer.

In an example embodiment, the formula corresponding to $f_m(i)$ is determined by means of one of the following approaches:

the radio resource control (RRC) layer message instruction;
the resource granting message instruction; and
the predefinition.

In an example embodiment, $N_{RB}^{sb}$ is determined by means of the following formula:

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases},$$

wherein $N_{RB}^{UL}$ is the total number of the resource blocks in one slot corresponding to the uplink bandwidth, $N_{RB}^{HO}$ is the frequency hopping offset, in an example embodiment, $0 \leq N_{RB}^{HO} \leq N_{RB}^{UL}$, and $\lfloor y \rfloor$ is the rounded down operation on y. In the example embodiment, $N_{RB}^{UL}$ is determined using the relevant technology, thereby reducing development costs.

In an example embodiment, $\tilde{n}_{VRB}$ is determined by means of the following formula:

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases},$$

wherein $N_{RB}^{HO}$ is the frequency hopping offset, in an example embodiment, $0 \leq N_{RB}^{HO} \leq N_{RB}^{UL}$, $\lceil x \rceil$ is the rounded up operation on x. In the example embodiment, $\tilde{n}_{VRB}$ is determined according to different values of $N_{sb}$, thereby improving the flexibility of the determination of $\tilde{n}_{VRB}$.

In order to improve the flexibility of the determination of the frequency hopping variable, the formula corresponding to the TTI Bundling frequency hopping variable i may be determined by means of one of the following approaches:

approach one: the radio resource control (RRC) layer message instruction;
approach two: the resource granting message instruction; and
approach three: the predefinition.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions so as to realise the same logic functions.

In another embodiment, a data transmission software is further provided, wherein the software is used for executing the above-mentioned embodiments and the technical solutions described in the example embodiments.

In still another embodiment, a storage medium is further provided, wherein the storage medium stores the above-mentioned data transmission software, and the storage medium includes but is not limited to: the optical disk, the floppy disk, the hard disk and the erasable memory, etc.

The embodiment of the disclosure also provides a data transmission device, wherein the data transmission device may be used for realizing the above-mentioned data transmission method and example embodiments, no further description is needed for the contents having been described. The components which are referred to in the data transmission device are described below. The term "component" as used below may be a combination of the software and/or hardware which can realise a pre-determined function. The system and method as described in the following embodiment are better realised by software, but the realization by hardware or a combination of software and hardware is also possible and contemplated.

Figure 4:
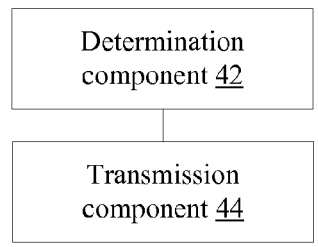
FIG. 4 is a structural block diagram of a data transmission device according to an embodiment of the disclosure.

FIG. 4 is a structural block diagram of a data transmission device according to an embodiment of the disclosure. As shown in FIG. 4, the device includes: a determination component 42 and a transmission component 44. The above-mentioned device is described in detail below.

The determination component 42 is configured to determine, by means of a frequency hopping manner according to a Transmission Time Interval Bundling (TTI Bundling) parameter, a frequency domain position of a physical resource block in a slot for sending the TTI Bundling, wherein the frequency hopping variable of the frequency hopping manner is determined according to the TTI Bundling parameter by means of one of or a combination of the following approaches, where mod is a modulus operation, floor is a rounded down operation, and $n_s$ is a slot sequence number:

$i=\text{floor}(n_s/(2*\text{TTI Bundling parameter}))+\text{mod}(\text{floor}(n_s/2),2),$ $i=\text{floor}(n_s/(\text{TTI Bundling parameter}))+\text{mod}(\text{floor}(n_s/2),2);$ and the transmission component 44 is coupled with the determination component 42 and configured to transmit data on a time frequency resource corresponding to the frequency domain position, which is determined by the determination component 42, of the physical resource block in the slot.

In an example embodiment, the TTI Bundling parameter is a positive integer and is determined according to the number of bundling Transmission Time Intervals (TTI), TTI_BUNDLING_SIZE, in the TTI Bundling. In an example embodiment, the TTI Bundling parameter may be the TTI_BUNDLING_SIZE.

In an example embodiment, the determination component 42 is configured to determine the frequency domain position $n_{PRB}$ according to the TTI Bundling frequency hopping variable i by means of the following formula:

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases},$$

wherein $\tilde{n}_{PRB}(n_s) = (\tilde{n}_{VRB} + f_{hop}(i) \cdot N_{RB}^{sb} + ((N_{RB}^{sb}-1) - 2(\tilde{n}_{VRB} \bmod N_{RB}^{sb})) \cdot f_m(i)) \bmod (N_{RB}^{sb} \cdot N_{sb})$, $\tilde{n}_{PRB}(n_s)$ is an offset index of the physical resource block, $\tilde{n}_{VRB}$ is an offset index of the virtual resource block, $N_{RB}^{HO}$ is a frequency hopping offset, $\lceil x \rceil$ is the rounded up operation on x, $f_{hop}(i)$ is a sub-band frequency hopping function, $N_{RB}^{sb}$ is the number of resource blocks within the sub-band, $f_m(i)$ is a mirroring frequency hopping function, mod is the modulus operation, $N_{sb}$ is the number of sub-bands, and $n_s$ is the slot sequence number.

Example Embodiment One

The present embodiment provides a resource frequency hopping method which is on the basis of Transmission Time Interval Bundling. The method includes: if the (enhanced) Transmission Time Interval Bundling and frequency hopping are started, the physical resource block, used for uplink transmission of the TTI Bundling, in the slot $n_s$ is determined according to the following formula:

$\tilde{n}_{PRB}(n_s) = (\tilde{n}_{VRB} + f_{hop}(i) \cdot N_{RB}^{sb} + ((N_{RB}^{sb}-1) - 2(\tilde{n}_{VRB} \bmod N_{RB}^{sb})) \cdot f_m(i)) \bmod (N_{RB}^{sb} \cdot N_{sb});$ wherein i may be determined by means of one the following approaches or the combinations thereof:

$i=\text{floor}(n_s/(2*\text{TTI Bundling parameter}))+\text{mod}(\text{floor}(n_s/2),2),$ $i=\text{floor}(n_s/(\text{TTI Bundling parameter}))+\text{mod}(\text{floor}(n_s/2),2);$ wherein TTI_BUNDLING_SIZE is the number of TTIs contained in the Transmission Time Interval Bundling, and the number of sub-bands $N_{sb}$ is configured via the RRC layer signalling.

In an example embodiment, the inter-subband Hopping function $f_{hop}(i)$ is determined by means of the following approach:

$$f_{hop}(i) = \begin{cases} 0 & N_{sb} = 1 \\ \left(\sum_{k=i\cdot 10+1}^{i\cdot 10+9} c(k) \times 2^{k-(i\cdot 10+1)}\right) \bmod N_{sb} & N_{sb} = 2 \\ \left(\left(\left(\sum_{k=i\cdot 10+1}^{i\cdot 10+9} c(k) \times 2^{k-(i\cdot 10+1)}\right) \bmod (N_{sb}-1)\right)+1\right) & N_{sb} > 2 \end{cases}.$$

In an example embodiment, the Hopping function within the sub-band is $f_m(i) = i \bmod 2;$ or $f_m(i) = c[((i \bmod 2) + \text{CURRENT\_TX\_NB}) \cdot q],$ wherein mod is the modulus function, CURRENT_TX_NB is the current number of times of transmission, and q is a positive integer.

In an example embodiment, the number $N_{RB}^{sb}$ of resource blocks in the sub-band is determined by means of the following formula:

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases},$$

In an example embodiment, $\tilde{n}_{VRB}$ is determined by the following formula:

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases},$$

wherein $n_{VRB}$ is the virtual resource block and can be instructed by means of a UL Grant signalling.

In an example embodiment, the physical resource block $n_{PRB}$ is determined by the following formula $$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}.$$

In an example embodiment, the RRC layer may configure i to be one of the following:

$i=\text{floor}(n_s/(2*\text{TTI Bundling parameter}))+\text{mod}(\text{floor}(n_s/2),2),$ $i=\text{floor}(n_s/(\text{TTI Bundling parameter}))+\text{mod}(\text{floor}(n_s/2),2);$ According to the resource frequency hopping method based on Transmission Time Interval Bundling, which is provided by the example embodiment, it can be guaranteed that the TTI Bundling technique can acquire more frequency diversity gain, without increasing the control cost.

Example Embodiment Two

Figure 5:
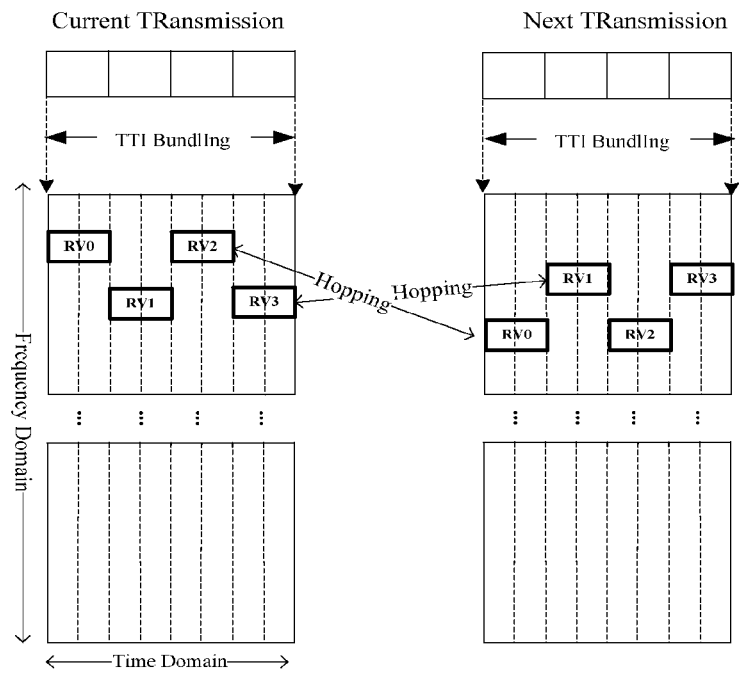
FIG. 5 is a resource allocation schematic diagram one of the Transmission Time Interval Bundling technique according to an embodiment of the disclosure.

The present embodiment provides a TTI Bundling data transmission method. FIG. 5 is a resource allocation schematic diagram one of the enhanced Transmission Time Interval Bundling technique according to an embodiment of the disclosure. As shown in FIG. 5, the VoIP service is transmitted using the TTI Bundling technique, wherein TTI_Bundling_Size=4, that is, 4 TTIs. The retransmission and the first transmission use the same HARQ process, but are not entirely the same in resource position depending on the frequency hopping manner and the parameter indicated by the signalling. The PDCCH corresponding to the first transmission of the TTI Bundling carries information about resource allocation or resource grant, and the information about the positions and the number of the physical resource blocks can be obtained according to the resource allocation information and frequency hopping manner. The frequency hopping manner may be determined according to the following formula:

$$\tilde{n}_{PRB}(n_s) = (\tilde{n}_{VRB} + f_{hop}(i) \cdot N_{RB}^{sb} + ((N_{RB}^{sb}-1) - 2(\tilde{n}_{VRB} \bmod N_{RB}^{sb})) \cdot f_m(i)) \bmod (N_{RB}^{sb} \cdot N_{sb});$$

In the present embodiment, the values of the parameters in the above-mentioned formula are described in detail as follows.

In the example embodiment, the TTI Bundling frequency hopping variable:

$$i = \text{floor}(n_s/(2 \cdot \text{TTI Bundling parameter})) + \bmod(\text{floor}(n_s/2), 2).$$

In the example embodiment, $$f_{hop}(i) = \begin{cases} 0 & N_{sb} = 1 \\ \left(\sum_{k=i\cdot 10+1}^{i\cdot 10+9} c(k) \times 2^{k-(i\cdot 10+1)}\right) \bmod N_{sb} & N_{sb} = 2 \\ \left(\left(\left(\sum_{k=i\cdot 10+1}^{i\cdot 10+9} c(k) \times 2^{k-(i\cdot 10+1)}\right) \bmod (N_{sb}-1)\right)+1\right) \bmod N_{sb} & N_{sb} > 2 \end{cases}.$$

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases}.$$

In the example embodiment, $f_m(i) = i \bmod 2$ $$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}.$$

In the example embodiment, $$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}.$$

In the example embodiment,
The values of the parameters in the above-mentioned formula are described as follows:
TTI_BUNDLING_SIZE=4;
$N_{RB}^{UL}$=50;
$N_{sb}$=1;
$N_{RB}^{HO}$=0
$n_s$ is an integer sequence from 0 to 19.
The random sequence used in the present embodiment is a random sequence of which the length is 500, and the random sequence is as follows:

```
0 1 1 1 1 1 1 1 0 0 0
0 1 1 1 1 0 0 1 1 1 1
1 1 0 0 0 1 1 1 1 1 1
0 1 0 1 1 0 0 1 0 1 1
1 1 0 0 1 1 1 1 1 1 1
1 1 0 1 0 1 1 0 1 1 0
0 0 1 1 1 0 1 1 1 0 1
1 1 0 1 1 0 1 1 1 1 1
1 1 0 1 0 1 1 0 0 0 1
1 0 1 1 0 1 1 0 0 0 1

1 1 1 0 1 1 1 1 1 0
1 1 1 1 1 1 0 0 1 1 1
0 0 0 1 1 1 1 1 0 1 1
1 1 1 1 0 1 1 1 1 0 1
0 1 1 1 1 1 0 1 1 0 1
1 1 1 1 1 1 1 0 1 1 0
1 1 1 1 1 1 1 1 1 1 1
1 0 0 1 1 1 0 1 1 1 0
1 1 0 1 0 0 0 1 1 1 0
1 0 1 1 1 1 1 1 1 1 1

1 1 0 1 1 1 1 1 0 1 1
1 1 1 1 1 1 0 1 0 1 1
1 1 0 0 0 0 0 1 1 0 1
1 1 1 0 1 1 1 1 1 0 1
1 1 0 0 1 1 1 0 0 1 1
1 1 0 0 0 1 0 0 1 1 1
1 0 0 1 1 1 1 1 0 0 0
1 0 1 1 0 1 0 1 0 1 1
1 1 1 1 1 1 0 0 0 0 0
1 0 1 1 1 1 0 0 1 0 1

1 1 1 1 1 1 1 1 0 0 1
0 1 1 1 0 0 0 0 1 1 1
0 1 1 0 0 1 0 1 1 1 0
1 1 1 0 0 1 1 0 0 0 1
1 1 1 1 1 1 1 1 1 1 0
0 1 1 0 1 1 0 1 0 0 1
1 0 1 0 1 1 0 1 1 0 0
1 1 1 0 1 1 1 0 1 0 1
1 1 1 0 1 0 1 1 1 1 0
1 0 1 1 0 1 1 0 0 1 0

0 0 1 1 1 1 1 1 0 1 0
1 0 1 0 1 1 0 1 1 1 1
0 1 1 1 1 1 0 0 0 1 0
1 1 1 1 1 0 0 1 1 1 0
1 1 1 1 1 1 1 0 1 1 0
1 1 1 1 1
```

It should be noted that the random sequence is merely used for schematic specification of the present example embodiment, and is not used to restrict the present application. During specific implementation, according to requirements, the random sequence of the pre-determined mode may be generated and the pre-determined lengths may be selected.

In the present embodiment, the UL Grant indicates $n_{VRB}=[2, 3]$, then according to the above-mentioned predefined frequency hopping manner, when the period of $n_s$ is 20 Slots, that is, 10 TTIs are used as a period, then the indexes (the frequency domain positions) $n_{PRB}$ of the physical resource blocks in Slots 0-19 are as shown in the following table 1:

TABLE 1 schematic table 1 of the indexes $n_{PRB}$ of the physical resource blocks in Slots 0-19

| $n_S = 0$ | $n_S = 1$ | $n_S = 2$ | $n_S = 3$ | $n_S = 4$ | $n_S = 5$ | $n_S = 6$ | $n_S = 7$ | $n_S = 8$ | $n_S = 9$ |
|---|---|---|---|---|---|---|---|---|---|
| 2 | 2 | 47 | 47 | 2 | 2 | 47 | 47 | 47 | 47 |
| 3 | 3 | 46 | 46 | 3 | 3 | 46 | 46 | 46 | 46 |

| $n_S = 10$ | $n_S = 11$ | $n_S = 12$ | $n_S = 13$ | $n_S = 14$ | $n_S = 15$ | $n_S = 16$ | $n_S = 17$ | $n_S = 18$ | $n_S = 19$ |
|---|---|---|---|---|---|---|---|---|---|
| 2 | 2 | 47 | 47 | 2 | 2 | 2 | 2 | 47 | 47 |
| 3 | 3 | 46 | 46 | 3 | 3 | 3 | 3 | 46 | 46 |

The indexes (the frequency domain positions) $n_{PRB}$ of the physical resource blocks in 20 Slots in the next 10 TTIs are the same as table 1.

| $n_S = 0$ | $n_S = 1$ | $n_S = 2$ | $n_S = 3$ | $n_S = 4$ | $n_S = 5$ | $n_S = 6$ | $n_S = 7$ | $n_S = 8$ | $n_S = 9$ |
|---|---|---|---|---|---|---|---|---|---|
| 2 | 2 | 47 | 47 | 2 | 2 | 47 | 47 | 47 | 47 |
| 3 | 3 | 46 | 46 | 3 | 3 | 46 | 46 | 46 | 46 |

| $n_S = 10$ | $n_S = 11$ | $n_S = 12$ | $n_S = 13$ | $n_S = 14$ | $n_S = 15$ | $n_S = 16$ | $n_S = 17$ | $n_S = 18$ | $n_S = 19$ |
|---|---|---|---|---|---|---|---|---|---|
| 2 | 2 | 47 | 47 | 2 | 2 | 2 | 2 | 47 | 47 |
| 3 | 3 | 46 | 46 | 3 | 3 | 3 | 3 | 46 | 46 |

If $N_{sb}=4$, $N_{RB}^{HO}=2$, the indexes $n_{PRB}$ of the physical resource blocks in Slots 0-19 are as shown in table 2.

TABLE 2 schematic table 2 of the indexes $n_{PRB}$ of the physical resource blocks in Slots 0-19

| $n_S = 0$ | $n_S = 1$ | $n_S = 2$ | $n_S = 3$ | $n_S = 4$ | $n_S = 5$ | $n_S = 6$ | $n_S = 7$ | $n_S = 8$ | $n_S = 9$ |
|---|---|---|---|---|---|---|---|---|---|
| 38 | 38 | 35 | 35 | 38 | 38 | 35 | 35 | 35 | 35 |
| 39 | 39 | 34 | 34 | 39 | 39 | 34 | 34 | 34 | 34 |

| $n_S = 10$ | $n_S = 11$ | $n_S = 12$ | $n_S = 13$ | $n_S = 14$ | $n_S = 15$ | $n_S = 16$ | $n_S = 17$ | $n_S = 18$ | $n_S = 19$ |
|---|---|---|---|---|---|---|---|---|---|
| 14 | 14 | 35 | 35 | 14 | 14 | 14 | 14 | 47 | 47 |
| 15 | 15 | 34 | 34 | 15 | 15 | 15 | 15 | 46 | 46 |

The indexes (the frequency domain positions) $n_{PRB}$ of the physical resource blocks in 20 Slots in the next 10 TTIs are the same as table 2. In the present embodiment, when the period of $n_s$ is 40 Slots, that is, Slots 0-39, table 1 is changed to be:

| $n_S = 0$ | $n_S = 1$ | $n_S = 2$ | $n_S = 3$ | $n_S = 4$ | $n_S = 5$ | $n_S = 6$ | $n_S = 7$ | $n_S = 8$ | $n_S = 9$ |
|---|---|---|---|---|---|---|---|---|---|
| 2 | 2 | 47 | 47 | 2 | 2 | 47 | 47 | 47 | 47 |
| 3 | 3 | 46 | 46 | 3 | 3 | 46 | 46 | 46 | 46 |

| $n_S = 10$ | $n_S = 11$ | $n_S = 12$ | $n_S = 13$ | $n_S = 14$ | $n_S = 15$ | $n_S = 16$ | $n_S = 17$ | $n_S = 18$ | $n_S = 19$ |
|---|---|---|---|---|---|---|---|---|---|
| 2 | 2 | 47 | 47 | 2 | 2 | 2 | 2 | 47 | 47 |
| 3 | 3 | 46 | 46 | 3 | 3 | 3 | 3 | 46 | 46 |

-continued

| $n_S = 20$ | $n_S = 21$ | $n_S = 22$ | $n_S = 23$ | $n_S = 24$ | $n_S = 25$ | $n_S = 26$ | $n_S = 27$ | $n_S = 28$ | $n_S = 29$ |
|---|---|---|---|---|---|---|---|---|---|
| 2 | 2 | 47 | 47 | 47 | 47 | 2 | 2 | 47 | 47 |
| 3 | 3 | 46 | 46 | 46 | 46 | 3 | 3 | 46 | 46 |

| $n_S = 30$ | $n_S = 31$ | $n_S = 32$ | $n_S = 33$ | $n_S = 34$ | $n_S = 35$ | $n_S = 36$ | $n_S = 37$ | $n_S = 38$ | $n_S = 39$ |
|---|---|---|---|---|---|---|---|---|---|
| 2 | 2 | 2 | 2 | 47 | 47 | 2 | 2 | 47 | 47 |
| 3 | 3 | 3 | 3 | 46 | 46 | 3 | 3 | 46 | 46 | table 2 is changed to be:

| $n_S = 0$ | $n_S = 1$ | $n_S = 2$ | $n_S = 3$ | $n_S = 4$ | $n_S = 5$ | $n_S = 6$ | $n_S = 7$ | $n_S = 8$ | $n_S = 9$ |
|---|---|---|---|---|---|---|---|---|---|
| 38 | 38 | 35 | 35 | 38 | 38 | 35 | 35 | 35 | 35 |
| 39 | 39 | 34 | 34 | 39 | 39 | 34 | 34 | 34 | 34 |

| $n_S = 10$ | $n_S = 11$ | $n_S = 12$ | $n_S = 13$ | $n_S = 14$ | $n_S = 15$ | $n_S = 16$ | $n_S = 17$ | $n_S = 18$ | $n_S = 19$ |
|---|---|---|---|---|---|---|---|---|---|
| 14 | 14 | 35 | 35 | 14 | 14 | 14 | 14 | 47 | 47 |
| 15 | 15 | 34 | 34 | 15 | 15 | 15 | 15 | 46 | 46 |

| $n_S = 20$ | $n_S = 21$ | $n_S = 22$ | $n_S = 23$ | $n_S = 24$ | $n_S = 25$ | $n_S = 26$ | $n_S = 27$ | $n_S = 28$ | $n_S = 29$ |
|---|---|---|---|---|---|---|---|---|---|
| 14 | 14 | 47 | 47 | 47 | 47 | 38 | 38 | 47 | 47 |
| 15 | 15 | 46 | 46 | 46 | 46 | 39 | 39 | 46 | 46 |

| $n_S = 30$ | $n_S = 31$ | $n_S = 32$ | $n_S = 33$ | $n_S = 34$ | $n_S = 35$ | $n_S = 36$ | $n_S = 37$ | $n_S = 38$ | $n_S = 39$ |
|---|---|---|---|---|---|---|---|---|---|
| 38 | 38 | 38 | 38 | 47 | 47 | 38 | 38 | 47 | 47 |
| 39 | 39 | 39 | 39 | 46 | 46 | 39 | 39 | 46 | 46 |

Example Embodiment Three

Figure 6:
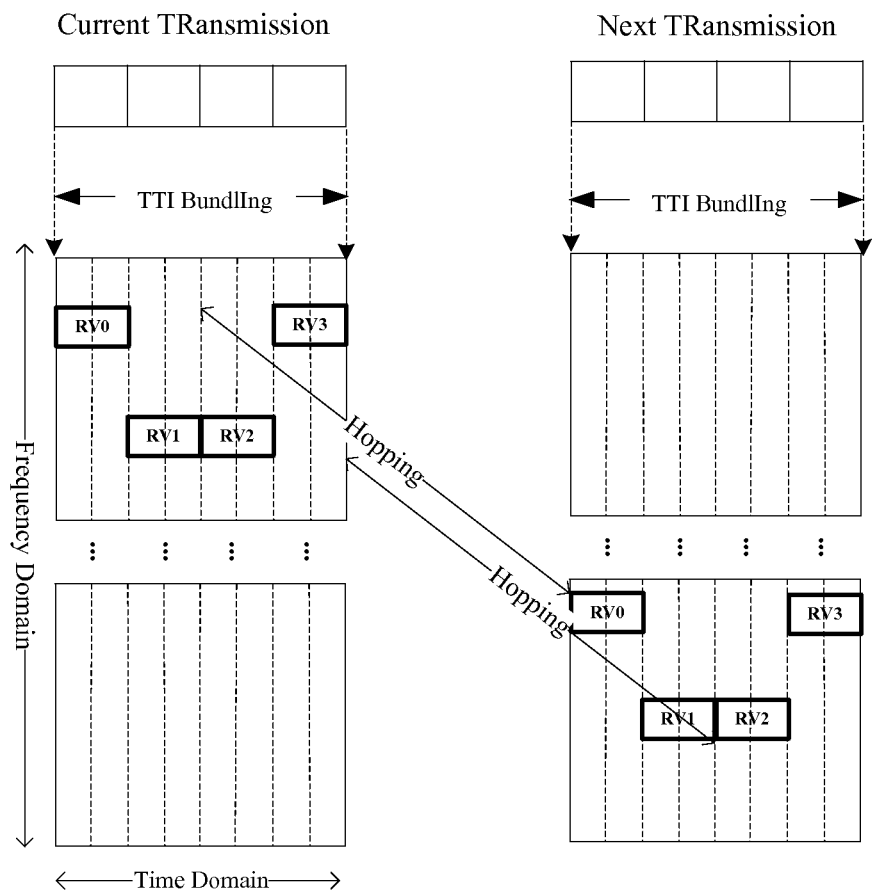
FIG. 6 is a resource allocation schematic diagram two of the Transmission Time Interval Bundling technique according to an embodiment of the disclosure.

The present embodiment provides a TTI Bundling data transmission method. FIG. 7 is a resource allocation schematic diagram two of the enhanced Transmission Time Interval Bundling technique according to an embodiment of the disclosure. As shown in FIG. 6, the VoIP service is transmitted using the TTI Bundling technique, wherein TTI Bundling Size=4, that is, 4 TTIs. The retransmission and the first transmission use the same HARQ process, but are not entirely the same in resource position depending on the frequency hopping manner and the parameter indicated by the signalling. The PDCCH corresponding to the first transmission of the TTI Bundling carries information about resource allocation or resource grant, and the information about the positions and the number of the physical resource blocks can be obtained according to the resource allocation information and frequency hopping manner. The frequency hopping manner may be determined according to the following formula:

$$\tilde{n}_{PRB}(n_s) = (\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i)) \bmod (N_{RB}^{sb} \cdot N_{sb}).$$

In the present embodiment, the values of the parameters in the above-mentioned formula are described in detail as follows:

The TTI Bundling frequency hopping variable $i = \text{floor}(n_s/(\text{TTI\_BUNDLING\_SIZE})) + \text{mod}(\text{floor}(n_s/2), 2)$.

In the example embodiment, $$f_{hop}(i) = \begin{cases} 0 & N_{sb} = 1 \\ \left(\sum_{k=i\cdot 10+1}^{i\cdot 10+9} c(k) \times 2^{k-(i\cdot 10+1)}\right) \bmod N_{sb} & N_{sb} = 2 \\ \left(\left(\left(\sum_{k=i\cdot 10+1}^{i\cdot 10+9} c(k) \times 2^{k-(i\cdot 10+1)}\right) \bmod (N_{sb} - 1)\right) + 1\right) \bmod N_{sb} & N_{sb} > 2 \end{cases}.$$

In the example embodiment, $f_m(i) = i \bmod 2$ $$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases}.$$

In the example embodiment, $$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}.$$

In the example embodiment, $$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}.$$

In the example embodiment,
The values of the parameters in the above-mentioned formula are described as follows:

TTI_BUNDLING_SIZE=4;
$N_{RB}^{UL}$=50;
$N_{sb}$=1;
$N_{RB}^{HO}$=0;
$n_s$ is an integer sequence from 0 to 19.
The present example embodiment adopts the same random sequence as example embodiment two.

In the present embodiment, the UL Grant indicates $n_{VRB}$=[2, 3], then according to the above-mentioned predefined frequency hopping Pattern method, when the period of $n_s$ is 20 Slots, that is, 10 TTIs are used as a period, then the indexes (the frequency domain positions) $n_{PRB}$ of the physical resource blocks in Slots 0-19 are as shown in the following table 3:

TABLE 3 schematic table 3 of the indexes $n_{PRB}$ of the physical resource blocks in Slots 0-19

| ns = 0 | ns = 1 | ns = 2 | ns = 3 | ns = 4 | ns = 5 | ns = 6 | ns = 7 | ns = 8 | ns = 9 |
|---|---|---|---|---|---|---|---|---|---|
| 2 | 2 | 47 | 47 | 47 | 47 | 2 | 2 | 2 | 2 |
| 3 | 3 | 46 | 46 | 46 | 46 | 3 | 3 | 3 | 3 |

| ns = 10 | ns = 11 | ns = 12 | ns = 13 | ns = 14 | ns = 15 | ns = 16 | ns = 17 | ns = 18 | ns = 19 |
|---|---|---|---|---|---|---|---|---|---|
| 47 | 47 | 47 | 47 | 2 | 2 | 2 | 2 | 47 | 47 |
| 46 | 46 | 46 | 46 | 3 | 3 | 3 | 3 | 46 | 46 |

The indexes (the frequency domain positions) $n_{PRB}$ of the physical resource blocks in 20 Slots in the next 10 TTIs are the same as table 1.

| $n_S$ = 0 | $n_S$ = 1 | $n_S$ = 2 | $n_S$ = 3 | $n_S$ = 4 | $n_S$ = 5 | $n_S$ = 6 | $n_S$ = 7 | $n_S$ = 8 | $n_S$ = 9 |
|---|---|---|---|---|---|---|---|---|---|
| 2 | 2 | 47 | 47 | 47 | 47 | 2 | 2 | 2 | 2 |
| 3 | 3 | 46 | 46 | 46 | 46 | 3 | 3 | 3 | 3 |

| $n_S$ = 10 | $n_S$ = 11 | $n_S$ = 12 | $n_S$ = 13 | $n_S$ = 14 | $n_S$ = 15 | $n_S$ = 16 | $n_S$ = 17 | $n_S$ = 18 | $n_S$ = 19 |
|---|---|---|---|---|---|---|---|---|---|
| 47 | 47 | 47 | 47 | 2 | 2 | 2 | 2 | 47 | 47 |
| 46 | 46 | 46 | 46 | 3 | 3 | 3 | 3 | 46 | 46 |

If $N_{sb}$=4, $N_{RB}^{HO}$=2, the indexes $n_{PRB}$ of the physical resource blocks in Slots 0-19 are as shown in table 4.

TABLE 4 schematic table 4 of the indexes $n_{PRB}$ of the physical resource blocks in Slots 0-19

| $n_S$ = 0 | $n_S$ = 1 | $n_S$ = 2 | $n_S$ = 3 | $n_S$ = 4 | $n_S$ = 5 | $n_S$ = 6 | $n_S$ = 7 | $n_S$ = 8 | $n_S$ = 9 |
|---|---|---|---|---|---|---|---|---|---|
| 35 | 35 | 32 | 32 | 32 | 32 | 13 | 13 | 13 | 13 |
| 36 | 36 | 31 | 31 | 31 | 31 | 14 | 14 | 14 | 14 |

| $n_S$ = 10 | $n_S$ = 11 | $n_S$ = 12 | $n_S$ = 13 | $n_S$ = 14 | $n_S$ = 15 | $n_S$ = 16 | $n_S$ = 17 | $n_S$ = 18 | $n_S$ = 19 |
|---|---|---|---|---|---|---|---|---|---|
| 43 | 43 | 43 | 43 | 35 | 35 | 35 | 35 | 43 | 43 |
| 42 | 42 | 42 | 42 | 36 | 36 | 36 | 36 | 42 | 42 |

When the period of $n_s$ is 40 Slots, that is, Slots 0-39, table 1 is changed to be:

| ns = 0 | ns = 1 | ns = 2 | ns = 3 | ns = 4 | ns = 5 | ns = 6 | ns = 7 | ns = 8 | ns = 9 |
|---|---|---|---|---|---|---|---|---|---|
| 2 | 2 | 45 | 45 | 45 | 45 | 2 | 2 | 2 | 2 |
| 3 | 3 | 44 | 44 | 44 | 44 | 3 | 3 | 3 | 3 |

| ns = 10 | ns = 11 | ns = 12 | ns = 13 | ns = 14 | ns = 15 | ns = 16 | ns = 17 | ns = 18 | ns = 19 |
|---|---|---|---|---|---|---|---|---|---|
| 45 | 45 | 45 | 45 | 2 | 2 | 2 | 2 | 45 | 45 |
| 44 | 44 | 44 | 44 | 3 | 3 | 3 | 3 | 44 | 44 |

| ns = 20 | ns = 21 | ns = 22 | ns = 23 | ns = 24 | ns = 25 | ns = 26 | ns = 27 | ns = 28 | ns = 29 |
|---|---|---|---|---|---|---|---|---|---|
| 45 | 45 | 2 | 2 | 2 | 2 | 45 | 45 | 45 | 45 |
| 44 | 44 | 3 | 3 | 3 | 3 | 44 | 44 | 44 | 44 |

-continued

| ns = 30 | ns = 31 | ns = 32 | ns = 33 | ns = 34 | ns = 35 | ns = 36 | ns = 37 | ns = 38 | ns = 39 |
|---|---|---|---|---|---|---|---|---|---|
| 2 | 2 | 2 | 2 | 45 | 45 | 45 | 45 | 2 | 2 |
| 3 | 3 | 3 | 3 | 44 | 44 | 44 | 44 | 3 | 3 | table 2 is changed to be:

| $n_S = 0$ | $n_S = 1$ | $n_S = 2$ | $n_S = 3$ | $n_S = 4$ | $n_S = 5$ | $n_S = 6$ | $n_S = 7$ | $n_S = 8$ | $n_S = 9$ |
|---|---|---|---|---|---|---|---|---|---|
| 35 | 35 | 32 | 32 | 32 | 32 | 13 | 13 | 13 | 13 |
| 36 | 36 | 31 | 31 | 31 | 31 | 14 | 14 | 14 | 14 |

| $n_S = 10$ | $n_S = 11$ | $n_S = 12$ | $n_S = 13$ | $n_S = 14$ | $n_S = 15$ | $n_S = 16$ | $n_S = 17$ | $n_S = 18$ | $n_S = 19$ |
|---|---|---|---|---|---|---|---|---|---|
| 43 | 43 | 43 | 43 | 35 | 35 | 35 | 35 | 43 | 43 |
| 42 | 42 | 42 | 42 | 36 | 36 | 36 | 36 | 42 | 42 |

| $n_S = 20$ | $n_S = 21$ | $n_S = 22$ | $n_S = 23$ | $n_S = 24$ | $n_S = 25$ | $n_S = 26$ | $n_S = 27$ | $n_S = 28$ | $n_S = 29$ |
|---|---|---|---|---|---|---|---|---|---|
| 43 | 43 | 24 | 24 | 24 | 24 | 21 | 21 | 21 | 21 |
| 42 | 42 | 25 | 25 | 25 | 25 | 20 | 20 | 20 | 20 |

| $n_S = 30$ | $n_S = 31$ | $n_S = 32$ | $n_S = 33$ | $n_S = 34$ | $n_S = 35$ | $n_S = 36$ | $n_S = 37$ | $n_S = 38$ | $n_S = 39$ |
|---|---|---|---|---|---|---|---|---|---|
| 13 | 13 | 13 | 13 | 21 | 21 | 21 | 21 | 13 | 13 |
| 14 | 14 | 14 | 14 | 20 | 20 | 20 | 20 | 14 | 14 |

It should be noted that embodiments two and three may combine with each other to form different solutions, for example, using different solutions at different moments or on different carriers, which will not be repeated again.

It should be noted that the above-mentioned embodiments use the number of slots being 20 and 40 for exemplification. According to different specific system configurations during implementation, the number of slots may be any value according to specific system configuration, and the frequency domain position may be determined on the basis of the number of slots by means of the method provided in the above-mentioned example embodiment, which will not be described here redundantly.

According to the above-mentioned embodiment, a data transmission method and device are provided, the frequency hopping position of the physical resource block in the slot for sending the TTI Bundling is determined by means of a frequency hopping manner according to the TTI Bundling parameter, thereby improving the frequency diversity gain of the TTI Bundling data, and improving the coverage area of data transmission. It should be noted that these technical effects may not be provided by all of the above-mentioned embodiments, and some technical effects may only be obtained by some example embodiments.

Obviously, those skilled in the art shall understand that the above-mentioned components and steps of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, or they are made into integrated circuit component respectively, or a plurality of components or steps thereof are made into one integrated circuit component. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined by the appended claims of the disclosure.

What is claimed is:

1. A data transmission method, comprising:
determining, by means of a frequency hopping manner according to a Transmission Time Interval Bundling (TTI Bundling) parameter, a frequency domain position of a physical resource block in a slot for sending a TTI Bundling, wherein a frequency hopping variable i of the frequency hopping manner is determined according to the TTI Bundling parameter by means of one of or a combination of the following approaches, where mod is a modulus operation, floor is a rounded down operation, and $n_s$ is a slot sequence number:

$i$=floor($n_s$/(2*TTI Bundling parameter))+mod(floor ($n_s$/2),2), $i$=floor($n_s$/(TTI Bundling parameter))+mod(floor($n_s$/ 2),2);

and transmitting data on a time frequency resource corresponding to the determined frequency domain position of the physical resource block in the slot of the TTI bundling.

2. The method according to claim 1, wherein the TTI Bundling parameter is a positive integer and is determined according to the number of bundling Transmission Time Intervals (TTI), TTI_BUNDLING_SIZE, in the TTI Bundling.

3. The method according to claim 1, wherein determining, by means of the frequency hopping manner according to the TTI Bundling parameter, the frequency domain position of the physical resource block in the slot for sending the TTI Bundling comprises:

determining the frequency domain position $n_{PRB}$ according to the TTI Bundling frequency hopping variable i by means of the following formula:

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases},$$

wherein $\tilde{n}_{PRB}(n_s) = (\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i)) \bmod (N_{RB}^{sb} \cdot N_{sb})$, $\tilde{n}_{PRB}(n_s)$ is an offset index of the physical resource block, $\tilde{n}_{PRB}$ is an offset index of a virtual resource block, $N_{RB}^{HO}$ is a frequency hopping offset, $\lceil x \rceil$ is a rounded up operation on x, $f_{hop}(i)$ is a sub-band frequency hopping function, $N_{RB}^{sb}$ is the number of resource blocks within a sub-band, $f_m(i)$ is a mirroring frequency hopping function, mod is the modulus operation, $N_{sb}$ is the number of sub-bands, and $n_s$ is the slot sequence number.

4. The method according to claim 3, wherein $f_{hop}(i)$ is determined according to the following formula:

$$f_{hop}(i) = \begin{cases} 0 & N_{sb} = 1 \\ \left(\sum_{k=i\cdot10+1}^{i\cdot10+9} c(k) \times k^{-(i\cdot10+1)}\right) \bmod N_{sb} & N_{sb} = 2 \\ \left(\left(\left(\sum_{k=i\cdot10+1}^{i\cdot10+9} c(k) \times 2^{k-(i\cdot10+1)}\right) \bmod(N_{sb}-1)\right) + 1\right) \bmod N_{sb} & N_{sb} > 2 \end{cases}$$

wherein mod is the modulus function, $N_{sb}$ is the number of sub-bands, c is a random sequence, and k is a serial number of the random sequence, with k being a non-negative integer.

5. The method according to claim 3, wherein $f_m(i)$ is determined according to the following formula:

$f_m(i) = i \bmod 2$; or, $f_m(i) = c[((i \bmod 2) + \text{CURRENT\_TX\_NB}) \cdot q]$ wherein mod is the modulus function, CURRENT_TX_NB is the current number of times of transmission, and q is a positive integer.

6. The method according to claim 5, wherein the formula corresponding to $f_m(i)$ is determined by means of one of the following approaches:

a radio resource control (RRC) layer message instruction;
a resource granting message instruction; and
a predefinition.

7. The method according to claim 3, wherein $N_{RB}^{sb}$ is determined according to the following formula:

$$N_{RB}^{sb} = \begin{cases} N_{RB}^{UL} & N_{sb} = 1 \\ \lfloor(N_{RB}^{UL} - N_{RB}^{HO} - N_{RB}^{HO} \bmod 2)/N_{sb}\rfloor & N_{sb} > 1 \end{cases}$$

wherein $N_{RB}^{UL}$ is the total number of resource blocks in one slot corresponding to an uplink bandwidth, $N_{RB}^{HO}$ is a frequency hopping offset, and $\lfloor y \rfloor$ a rounded down operation on y.

8. The method according to claim 3, wherein $\tilde{n}_{VRB}$ is determined according to the following formula:

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases};$$

wherein $N_{RB}^{HO}$ is a frequency hopping offset, $n_{VRB}$ is a virtual resource block index, and $\lceil x \rceil$ is a rounded up operation on x.

9. The method according to claim 3, wherein the formula corresponding to the TTI Bundling frequency hopping variable i is determined by means of one of the following approaches:

an RRC layer message instruction;
a resource granting message instruction; and
a predefinition.

10. A data transmission device, comprising:
a determination component which is configured to determine, by means of a frequency hopping manner according to the Transmission Time Interval Bundling (TTI Bundling) parameter, a frequency domain position of a physical resource block in a slot for sending a TTI Bundling, wherein a frequency hopping variable i of the frequency hopping manner is determined according to the TTI Bundling parameter by means of one of or a combination of the following approaches, where mod is a modulus operation, floor is a rounded down operation, and $n_s$ is a slot sequence number:

$i = \text{floor}(n_s/(2*\text{TTI Bundling parameter})) + \bmod(\text{floor}(n_s/2), 2)$;

$i = \text{floor}(n_s/(\text{TTI Bundling parameter})) + \bmod(\text{floor}(n_s/2), 2)$;

and a transmission component which is configured to transmit data on a time frequency resource corresponding to the determined frequency domain position of the physical resource block in the slot.

11. The device according to claim 10, wherein the TTI Bundling parameter is a positive integer and is determined according to the number of bundling Transmission Time Intervals (TTI), TTI_BUNDLING_SIZE, in the TTI Bundling.

12. The device according to claim 10, wherein the determination component is configured to determine the frequency domain position $n_{PRB}$ according to the TTI Bundling frequency hopping variable i by means of the following formula:

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases},$$

wherein $\tilde{n}_{PRB}(n_s) = (\tilde{n}_{VRB} + f_{hop}(i) \cdot N_{RB}^{sb} + ((N_{RB}^{sb} - 1) - 2(\tilde{n}_{VRB} \bmod N_{RB}^{sb})) \cdot f_m(i)) \bmod(N_{RB}^{sb} \cdot N_{sb})$, $\tilde{n}_{PRB}(n_s)$ is an offset index of the physical resource block, $\tilde{n}_{VRB}$ is an offset index of a virtual resource block, $N_{RB}^{HO}$ is a frequency hopping offset, $\lceil x \rceil$ is a rounded up operation on x, $f_{hop}(i)$ is a sub-band frequency hopping function, $N_{RB}^{sb}$ is the number of resource blocks within a sub-band, $f_m(i)$ is a mirroring frequency hopping function, mod is the modulus operation, $N_{sb}$ is the number of sub-bands, and $n_s$ is the slot sequence number.

13. The method according to claim 4, wherein the formula corresponding to the TTI Bundling frequency hopping variable i is determined by means of one of the following approaches:

an RRC layer message instruction;
a resource granting message instruction; and
a predefinition.

14. The method according to claim 5, wherein the formula corresponding to the TTI Bundling frequency hopping variable i is determined by means of one of the following approaches:
an RRC layer message instruction;
a resource granting message instruction; and
a predefinition.

15. The method according to claim 6, wherein the formula corresponding to the TTI Bundling frequency hopping variable i is determined by means of one of the following approaches:
an RRC layer message instruction;
a resource granting message instruction; and
a predefinition.

16. The method according to claim 7, wherein the formula corresponding to the TTI Bundling frequency hopping variable i is determined by means of one of the following approaches:
an RRC layer message instruction;
a resource granting message instruction; and
a predefinition.

17. The method according to claim 8, wherein the formula corresponding to the TTI Bundling frequency hopping variable i is determined by means of one of the following approaches:
an RRC layer message instruction;
a resource granting message instruction; and
a predefinition.

18. The device according to claim 12, wherein $f_{hop}(i)$ is determined according to the following formula:

$$f_{hop}(i) = \begin{cases} 0 & N_{sb} = 1 \\ \left(\sum_{k=i\cdot 10+1}^{i\cdot 10+9} c(k) \times k^{-(i\cdot 10+1)}\right) \bmod N_{sb} & N_{sb} = 2 \\ \left(\left(\left(\sum_{k=i\cdot 10+1}^{i\cdot 10+9} c(k) \times 2^{k-(i\cdot 10+1)}\right) \bmod (N_{sb}-1)\right) + 1\right) \bmod N_{sb} & N_{sb} > 2 \end{cases}$$

wherein mod is the modulus function, $N_{sb}$ is the number of sub-bands, c is a random sequence, and k is a serial number of the random sequence, with k being a non-negative integer;
$f_m(i)$ is determined according to the following formula:

$f_m(i) = i \bmod 2$; or, $f_m(i) = c[((i \bmod 2) + CURRENT\_TX\_NB) \cdot q]$ wherein mod is the modulus function, CURRENT_TX_NB is the current number of times of transmission, and q is a positive integer;
$N_{RB}^{sb}$ is determined according to the following formula:

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases}$$

wherein $N_{RB}^{UL}$ is the total number of resource blocks in one slot corresponding to an uplink bandwidth, $N_{RB}^{HO}$ is a frequency hopping offset, and $\lfloor y \rfloor$ a rounded down operation on y;
$\tilde{n}_{VRB}$ is determined according to the following formula:

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases};$$

wherein $N_{RB}^{HO}$ is a frequency hopping offset, $n_{VRB}$ is a virtual resource block index, and $\lceil x \rceil$ is a rounded up operation on x.

19. The device according to claim 18, wherein the formula corresponding to $f_m(i)$ is determined by means of one of the following approaches:
a radio resource control (RRC) layer message instruction;
a resource granting message instruction; and
a predefinition.

20. The device according to claim 12, wherein the formula corresponding to the TTI Bundling frequency hopping variable i is determined by means of one of the following approaches:
an RRC layer message instruction;
a resource granting message instruction; and
a predefinition.

* * * * *